US012759139B2

(12) United States Patent
Ishikawa

(10) Patent No.: US 12,759,139 B2
(45) Date of Patent: Oct. 13, 2026

(54) TRANSMISSION MECHANISM AND ROBOT

(71) Applicant: HONDA MOTOR CO., LTD., Tokyo (JP)

(72) Inventor: Tetsuya Ishikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/917,010

(22) Filed: Oct. 16, 2024

(65) Prior Publication Data

US 2025/0303553 A1 Oct. 2, 2025

(30) Foreign Application Priority Data

Mar. 26, 2024 (JP) ................................ 2024-049606

(51) Int. Cl.

| | |
|---|---|
| ***B25J 9/10*** | (2006.01) |
| ***B25J 9/12*** | (2006.01) |
| ***B25J 19/02*** | (2006.01) |
| ***F16C 1/02*** | (2006.01) |
| ***F16C 1/08*** | (2006.01) |

(52) U.S. Cl.

CPC .............. *B25J 9/104* (2013.01); *B25J 9/103* (2013.01); *B25J 9/126* (2013.01); *B25J 19/02* (2013.01); *F16C 1/02* (2013.01); *F16C 1/08* (2013.01)

(58) Field of Classification Search

CPC ... B25J 9/103; B25J 9/104; B25J 9/126; B25J 19/02; F16C 1/02; F16C 1/08

See application file for complete search history.

(56) References Cited

U.S. PATENT DOCUMENTS

| | | | | |
|---|---|---|---|---|
| 1,649,310 A * | 11/1927 | Joline | F16C 1/08 | 428/592 |
| 5,656,903 A * | 8/1997 | Shui | G05B 19/19 | 901/4 |
| 12,226,906 B2 * | 2/2025 | Lefeber | A61F 5/0123 | |
| 2012/0240694 A1 * | 9/2012 | Isobe | A61B 17/1631 | 74/25 |
| 2015/0096392 A1 * | 4/2015 | Garrec | F16C 1/06 | 74/89.23 |

FOREIGN PATENT DOCUMENTS

JP 5301934 B2 9/2013

* cited by examiner

*Primary Examiner* — Joseph Brown

(74) *Attorney, Agent, or Firm* — Armstrong Teasdale LLP

(57) ABSTRACT

A transmission mechanism configured to be interposed between a drive device and a driven member configured to be driven by a torque outputted by the drive device, the transmission mechanism comprises a flexible shaft having an input end receiving the torque outputted by the drive device, a conversion mechanism having an input shaft supported by a link member via a first bearing in a rotatable but axially immovable manner and configured to receive the torque from the flexible shaft and a converter for converting the torque of the input shaft into an axial force, and a blocking device that allows the transmission of the torque from the flexible shaft to the input shaft but blocks transmission of the axial force from the flexible shaft to the input shaft.

15 Claims, 6 Drawing Sheets

TRANSMISSION MECHANISM AND ROBOT

TECHNICAL FIELD

The present invention relates to a transmission mechanism for transmitting torque, and a robot equipped with the transmission mechanism.

BACKGROUND ART

Conventionally, flexible shafts are known in the art as a form of power transmission mechanism that can be freely bent and deformed and can still transmit torque even in such a deformed state. As an example of applying a flexible shaft to the power transmission of a robot arm, a robot hand configured to transmit the torque of a motor to an input shaft of a reduction mechanism via a flexible shaft is known in the art. See JP5301934B2, for example. In this robot hand, an encoder is fitted to the output end of the flexible shaft, and the rotation of the motor is controlled based on the detection value of the encoder.

When controlling the output end of a robot hand, not only position control but also force control is important. In order to perform force control, it is necessary to detect the output torque at the output end of the robot hand. In order to detect the output torque, for example, a force sensor such as a torque sensor may be provided between the output end (fingers, etc.) of the robot hand and the reduction mechanism.

Instead of a rotational reduction mechanism, a conversion mechanism that converts rotary motion into linear motion, such as a ball screw, may be provided between the flexible shaft and the output end of the robot hand. In this case, the axial load (also called axial force or thrust) generated by the output member of the conversion mechanism may be measured so that the robot hand may be controlled by force control based on the axial force. In order to measure the axial force of the output member, for example, a load sensor such as a load cell may be provided between the bearing that supports the input shaft of the conversion mechanism and the base member that supports the bearing.

However, since the bending and twisting deformation of the flexible shaft creates an axial force, the input shaft of the conversion mechanism is subjected to not only the input torque but also the axial force inputted from the flexible shaft. Therefore, the axial force of the input shaft detected by the load sensor contains a spurious component that can be attributed to the axial force inputted from the flexible shaft. Therefore, it is difficult to accurately measure the true axial force of the output member, and this adversely affects the accuracy of the force control.

SUMMARY OF THE INVENTION

In view of the above background, a primary object of the present invention is to provide a transmission mechanism that allows the axial force to be accurately detected for a precise force control, and a robot equipped with such a transmission mechanism.

In order to accomplish such an object, one aspect of the present invention provides a transmission mechanism (10) configured to be interposed between a drive device (6) and a driven member (4) configured to be driven by a torque outputted by the drive device, the transmission mechanism comprising: a flexible shaft (12) having an input end receiving the torque outputted by the drive device and an output end outputting the torque; a conversion mechanism (11) having an input shaft (15) supported by a link member (3) via a first bearing (17) in a rotatable but axially immovable manner and configured to receive the torque from the flexible shaft, a converter (15, 16) for converting the torque of the input shaft into an axial force, and an output member (16) outputting the axial force provided by the converter; and a blocking device (19, 44) that allows the transmission of the torque from the flexible shaft to the input shaft but blocks transmission of the axial force from the flexible shaft to the input shaft.

According to this aspect, the transmission of the axial force from the flexible shaft to the input shaft is blocked by the blocking device so that the axial force applied to the input shaft purely consists of the axial force generated in the output member. Therefore, simply by detecting the axial force of the input shaft, the axial force of the output member can be accurately measured.

In this transmission mechanism, preferably, the conversion mechanism includes a screw shaft that forms a part of the input shaft and a nut threading with the screw shaft and forms a part of the output member.

According to this aspect, an external force in the axial direction that is applied to the nut can be accurately detected by measuring the axial force applied to the input shaft so that the axial force required for the accurate control of the drive device can be easily measured.

In this transmission mechanism, preferably, the screw shaft is rotatably supported by a first bearing (17) which is axially immovably supported by the link member, and the blocking device is provided between the screw shaft and the flexible shaft.

According to this aspect, the axial force of the screw shaft is transmitted to the first bearing, but the axial force of the flexible shaft is blocked from being transmitted to the first bearing. Therefore, the axial force of the nut or the output member can be accurately detected from the axial force applied to the first bearing.

In this transmission mechanism, preferably, the blocking device includes a coupling (19) for connecting the screw shaft to the flexible shaft in an axially movable but rotationally fast manner, and a second bearing (44) supporting the flexible shaft on the link member freely rotatable but axially immovable manner.

According to this aspect, the coupling permits torque to be transmitted from the flexible shaft to the screw shaft. On the other hand, the coupling blocks the axial force inputted from the flexible shaft to be transmitted to the screw shaft. Therefore, the transmission of the axial force from the flexible shaft to the screw shaft is blocked.

In this transmission mechanism, preferably, the coupling includes a spline coupling.

The spline coupling provides a simple structure for allowing the torque to be transmitted from the flexible shaft to the screw shaft while blocking the axial force to be transmitted from the flexible shaft to the screw shaft.

In this transmission mechanism, preferably, the transmission mechanism further comprises a load sensor (18) provided between the link member and the first bearing to measure an axial load of the screw shaft.

According to this aspect, the axial load of the ball screw can be measured by the load sensor, so that highly accurate force control can be achieved.

In this transmission mechanism, preferably, the flexible shaft includes a plurality of wire coils wound in a plurality of coaxial layers and in alternating directions.

Thereby, the flexible shaft can transmit torque in both clockwise direction and anti-clockwise direction with a similar torque transmitting property so that a favorable force control can be achieved.

In order to accomplish such an object, another aspect of the present invention provides a robot, comprising: the transmission mechanism according to claim 1; a base member (2) supporting the drive device (6) and movably supporting the link member (3); and a driven member (4) connected to the output member in an actuatable manner.

According to this aspect, a robot can be provided that allows an accurate detection of the axial force of the input shaft for an accurate force control.

The present invention thus provides a transmission mechanism that allows the axial force to be accurately detected for a precise force control, and a robot equipped with such a transmission mechanism.

DESCRIPTION OF THE PREFERRED EMBODIMENT(S)

A robot in particular a part of a robot hand incorporated with a torque transmission mechanism according to an embodiment of the present invention will be described in the following with reference to the appended drawings.

Figure 1:
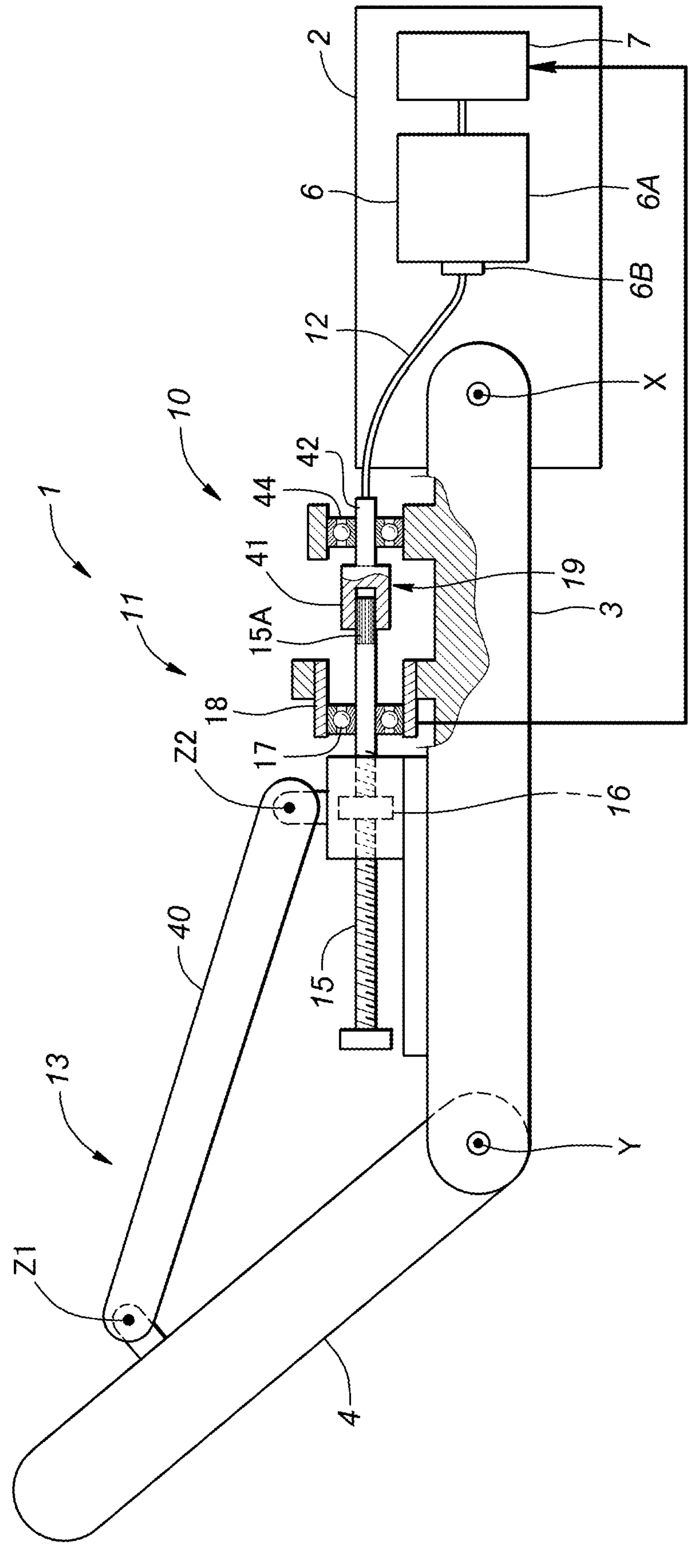
FIG. 1 is a diagram of a robot provided with a transmission mechanism according to an embodiment of the present invention.

The robot 1 of the present embodiment shown in FIG. 1 includes a multi-joint actuator having multiple joints. The configuration shown in FIG. 1 is merely an example, and the present invention is not limited to this configuration.

As shown in FIG. 1, the robot 1 comprises a base member 2, a link member 3 pivotably connected to the base member 2, and a driven member 4 pivotably connected to the link member 3.

The base member 2 is provided with a first drive device 6, a second drive device (not shown in the drawings), and a control device 7 that individually controls the first drive device 6 and the second drive device.

The first drive device 6 is configured to be able to output torque in either direction. The first drive device 6 may consist of an electric motor of any kind that has a main body 6A fixed to the base member 2 and an output shaft 6B that is supported by the main body 6A and can rotate in either direction.

The second drive device is also configured to be able to output torque in either direction. The second drive device may consist of an electric motor of any kind that has a main body fixed to the base member and an output shaft that is supported by the main body and can rotate in either direction. The second drive device is configured to actuate the link member 3 relative to the base member 2 via a transmission mechanism not shown in the drawings.

Figure 3:
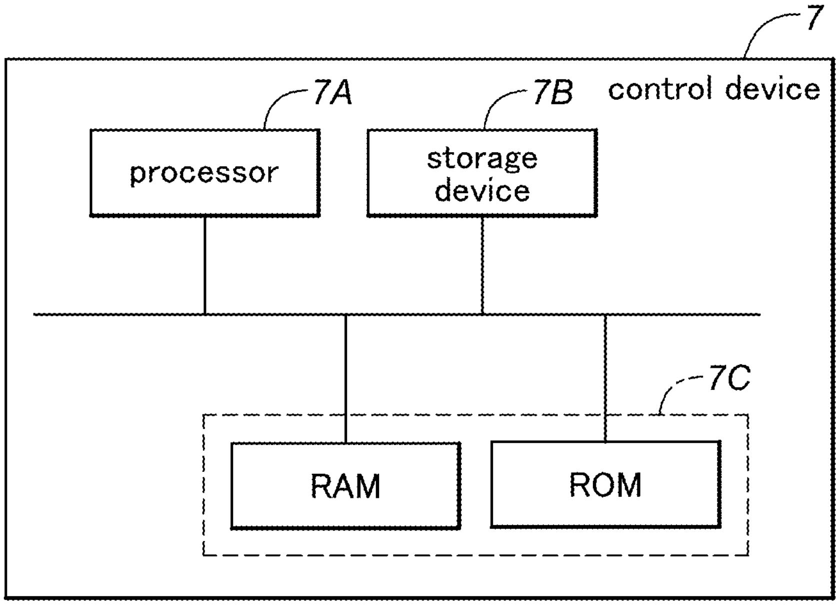
FIG. 3 is a simplified block diagram of a control device for the transmission mechanism.

As shown in FIG. 3, the control device 7 is configured as a microcomputer equipped with a processor 7A consisting of a central processing unit (CPU) or the like, a storage device 7B such as an HDD or SSD, and memory 7C consisting of RAM or ROM. The control device 7 is configured so that the processor 7A reads necessary data and software from the storage device 7B and executes a predetermined calculation process according to the software. The first drive device 6, the second drive device, and the control device 7 may each be supported by the base member 2 via a plurality of members, or may be provided on a member other than the base member 2.

As shown in FIG. 1, the link member 3 is a bar member, and one end of the link member 3 is rotatably connected to the base member 2. In this embodiment, the link member 3 is pivotally supported by the base member 2. A gearbox may be provided between the link member 3 and the output shaft of the second drive device to convert the rotation of the output shaft into the rotation of the link member 3 relative to the base member 2. However, the connection mode between the link member 3 and the base member 2 is not limited to this mode. For example, the link member 3 may be directly connected to the output shaft of the second drive device, so that the link member 3 is rotatably supported on the base member 2 via the second drive device.

In this embodiment, the driven member 4 is pivotally connected to the link member 3 so as to be rotatable in either direction around the axis Y. The bidirectional torque output from the first drive device 6 is transmitted to the driven member 4 by a transmission mechanism 10, and the driven member 4 is driven to rotate in either direction relative to the link member 3.

The driven member 4 is connected to the first drive device 6 via a transmission mechanism 10. The transmission mechanism 10 is interposed between the driven member 4 and the first drive device 6, and performs the function of transmitting the rotation and torque output from the first drive device 6 to the driven member 4. The driven member 4 is driven by the rotation and torque output from the first drive device 6 transmitted by the transmission mechanism 10.

In the example shown in FIG. 1, the rotational axis X of the link member 3 relative to the base member 2 and the rotational axis Y of the driven member 4 relative to the link member 3 are perpendicular to the page and parallel to each other. However, the direction of the rotational axis X of the link member 3 relative to the base member 2 is not limited to this example, and for example, the rotational axis X of the link member 3 relative to the base member 2 may be parallel to the page (for example, a vertical direction on the page).

The transmission mechanism 10 includes a single-axis conversion mechanism 11 that is supported by the link member 3 and converts the torque output from the first drive device 6 into an axial force, a flexible shaft 12 that is interposed between the first drive device 6 and the single-axis conversion mechanism 11, and a displacement mechanism 13 that converts the axial force of the single-axis conversion mechanism 11 into an angular displacement of the driven member 4.

Figure 2:
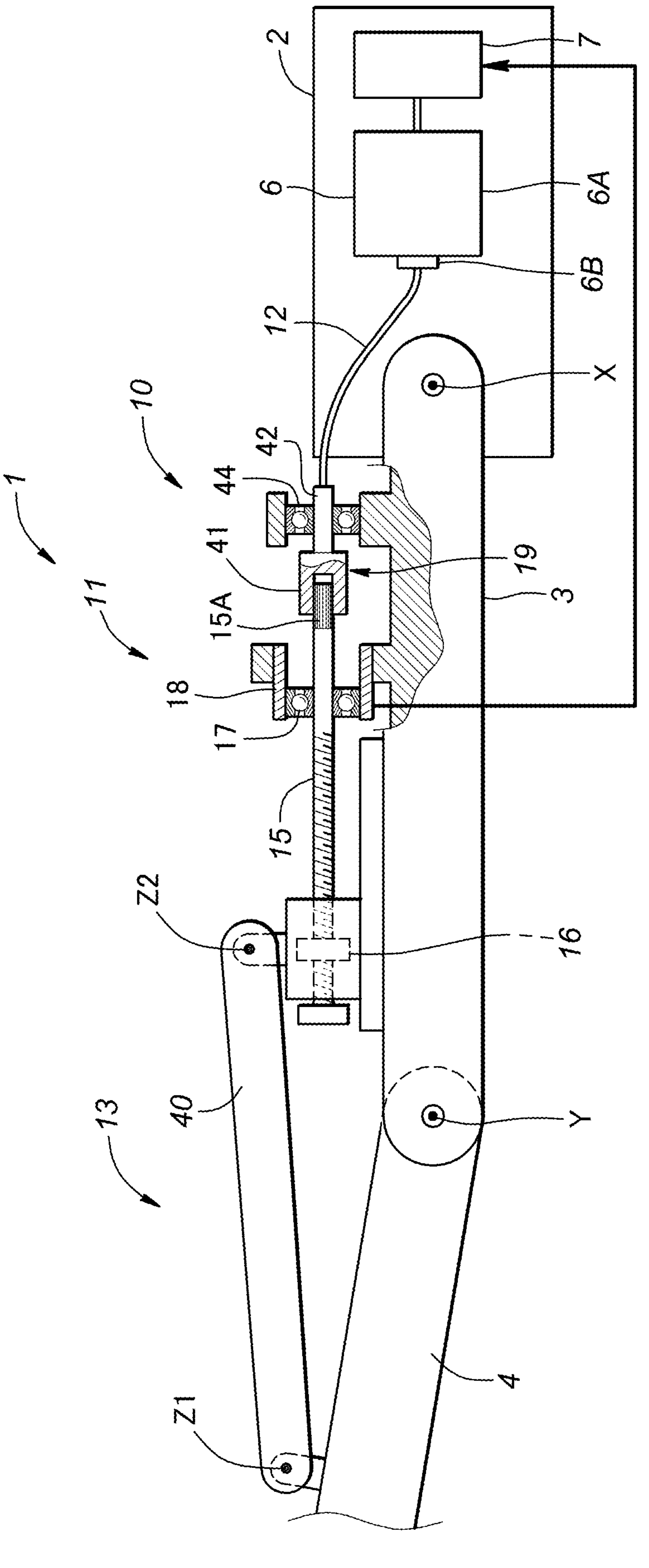
FIG. 2 is a view similar to FIG. 1 showing the state where the output member or the nut has advanced leftward.

The single-axis conversion mechanism 11 is composed of a ball screw mechanism, which includes a screw shaft 15, a nut 16, and balls (not shown). When one of the screw shaft 15 and the nut 16 is rotated, the other moves in a linear direction along the axis of the screw shaft 15. In this embodiment, the screw shaft 15 is supported by the link member 3 so that it can rotate but cannot move in the axial direction, and the nut 16 is supported by the link member 3 so that it can move in the axial direction of the screw shaft 15 but cannot rotate. In other words, the single-axis conversion mechanism 11 converts the rotational motion (torque) of the screw shaft 15 into the linear motion (axial force) of the nut 16 and outputs this motion. FIG. 2 shows the state of the robot 1 when the nut 16 has advanced from the position shown in FIG. 1 owing to the rotation of the screw shaft 15.

The screw shaft 15 of the single-axis conversion mechanism 11 is supported by the first bearing 17 and serves as an input member to which torque is applied. The nut 16 of the single-axis conversion mechanism 11 serves as an output member that converts the rotational motion of the screw shaft 15 into linear motion and outputs an axial force in the linear motion direction of the nut 16. The first bearing 17 may be, for example, a ball bearing containing steel balls or a roller bearing containing steel rollers. When the first bearing 17 consists of a roller bearing, the shape of the roller may be cylindrical, needle-like, conical, barrel-shaped, etc. The inner race of the first bearing 17 is fitted onto the outer surface of the screw shaft 15. The outer race of the first bearing 17 is supported by the link member 3 via a load cell 18. The first bearing 17 supports the load in the rotational axis direction (thrust load) as well as the radial load of the screw shaft 15. The load cell 18 is a force sensor (load sensor) that can measure the magnitude of force in one direction, and is configured to detect the axial load of the screw shaft 15. The detection signal of the load cell 18 is forwarded to the control device 7.

The single-axis conversion mechanism 11 and the flexible shaft 12 are connected to each other via a coupling 19. The configuration and support structure of the coupling 19 will be described in detail later.

The flexible shaft 12 transmits the torque output from the first drive device 6 to the single-axis conversion mechanism 11. As shown in FIG. 4, the flexible shaft 12 includes an inner shaft 21 (also called a shaft or a core) and an outer tube 22 (also called an outer case or a casing).

Figure 4A:
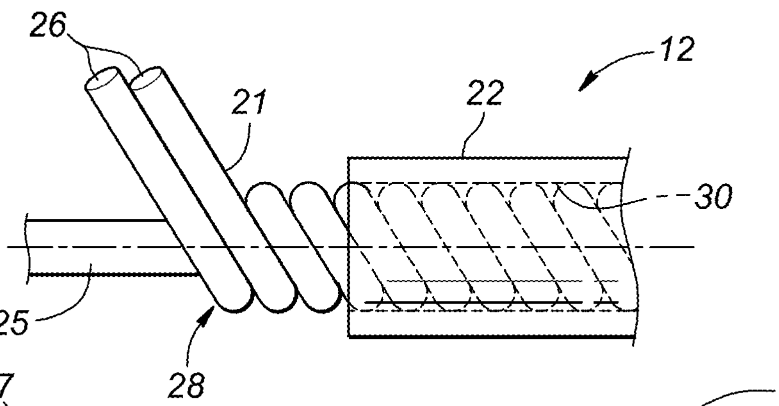
FIG. 4A is a side view of a flexible cable according to a first embodiment.
Figure 4B:
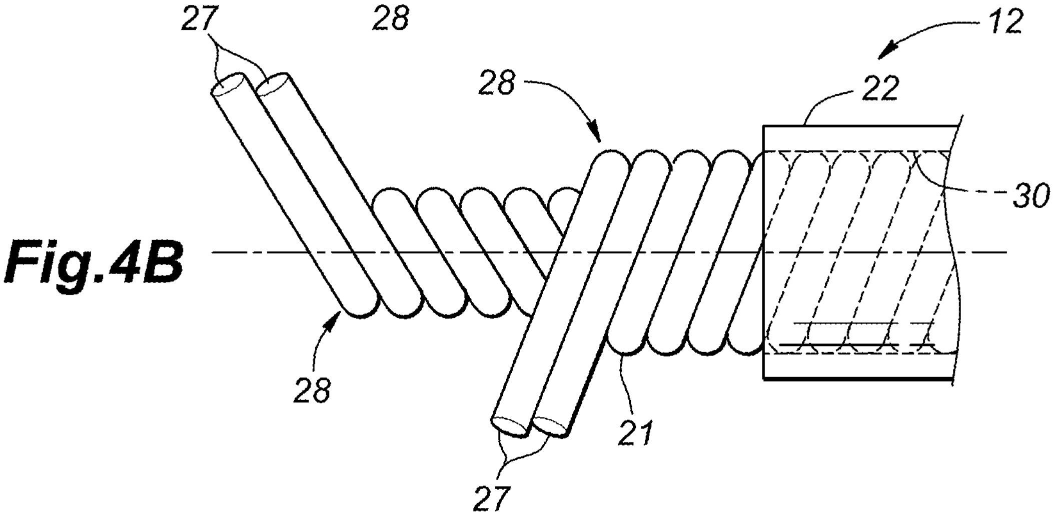
FIG. 4B is a side view of a flexible cable according to a second embodiment.
Figure 4C:
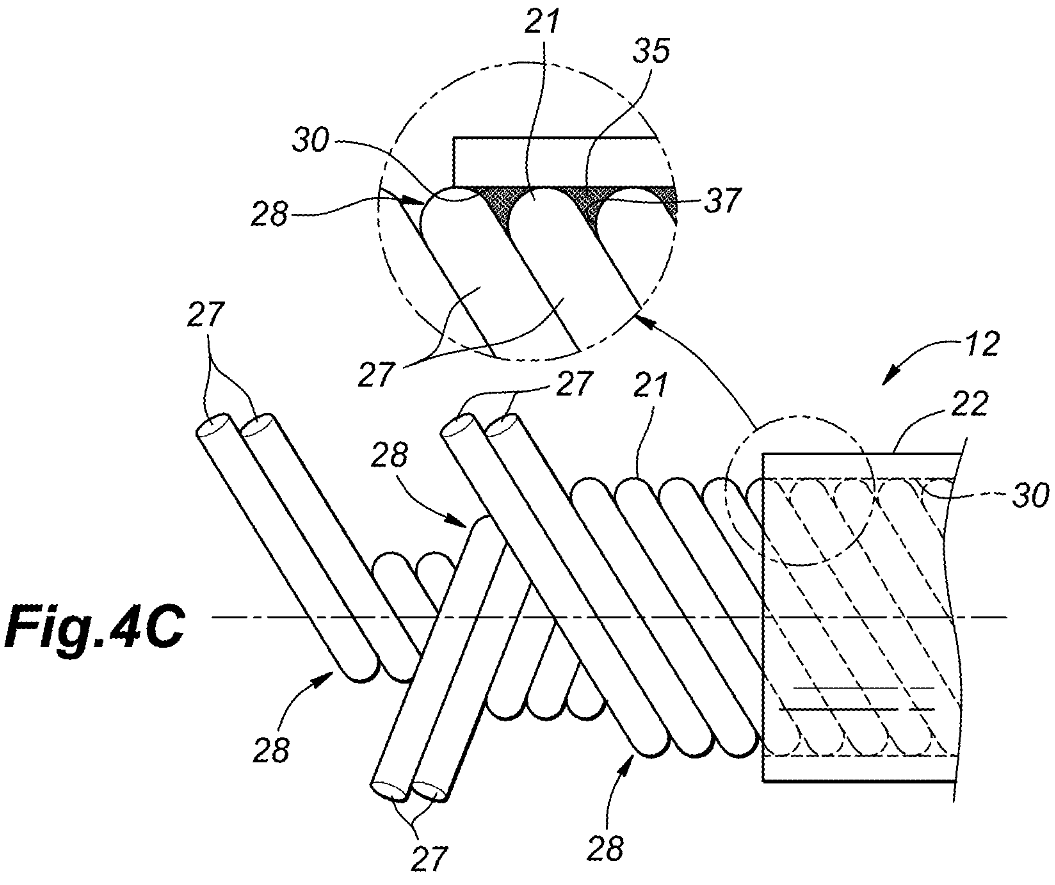
FIG. 4C is a side view of a flexible cable according to a third embodiment.

As shown in FIGS. 4A to 4C, the inner shaft 21 is a wire extending along an axis. The inner shaft 21 is flexible and configured to be bendable. The inner shaft 21 may be formed, for example, by multiple wires twisted to form a spiral shape. As shown in FIG. 4A, the inner shaft 21 may be formed by winding one or more layers of wire 26 around a single bendable core wire 25 (core wire).

As shown in FIG. 4B and FIG. 4C, the inner shaft 21 may be formed by winding a plurality of wires 27 each made of steel wire or the like in a band shape in a prescribed direction at a predetermined pitch angle with respect to the axis to form a first winding layer 28, and then winding a plurality of wires 27 in a band shape in the opposite direction to form a second layer 28 and a third additional layer 28.

In this embodiment, as shown in FIG. 4C, the inner shaft 21 includes a first layer made of wires 27 with a circular cross section wound in one direction over the entire length thereof, a second layer made of wires 27 with a circular cross section wound in the opposite direction to the first layer over the entire length thereof, and a third layer made of wires 27 with a circular cross section wound in the opposite direction to the second layer over the entire length thereof. The flexible shaft 12 thus includes a plurality of wire coils wound in a plurality of coaxial layers and in alternating directions.

The inner shaft 21 may also be formed by connecting two mirror-symmetric shafts at their ends. For example, the inner shaft 21 may include a driving side shaft provided on the driving side and a driven side shaft provided on the driven side and having the same length as the driving side shaft, and the winding direction of the wires 27 constituting the driving side shaft is opposite to the winding direction of the wires 27 constituting the driven side shaft, the ends of the driven side shaft and the end of the driving side shaft being connected to each other.

Thereby, the torsional rigidity property of the flexible shaft 12 may be made a symmetric with respect to the origin.

As shown in FIGS. 4A to 4C, the outer tube 22 is configured to be bendable like the inner shaft 21. The inner shaft 21 is slidably received in the inner bore 30 of the outer tube 22. Thus, the outer tube 22 protects the inner shaft 21 from dust and moisture.

In addition, because the outer tube 22 is provided, the flexible shaft 12 does not come into direct contact with the surrounding objects such as the base member 2, the link member 3, and the driven member 4 during high-speed rotation of the inner shaft 21. Therefore, damage to surrounding objects is prevented, and surrounding objects can be protected. Even when power is transmitted with multiple flexible shafts 12 that are bundled together, adjacent inner shafts 21 do not come into direct contact with each other, so that the inner shafts 21 are prevented from coming into contact with other inner shafts 21, and are thereby prevented from being damaged during high-speed rotation.

When torque is applied to one end of the inner shaft 21 (for example, the end on the drive device side), the inner shaft 21 rotates relative to the outer tube 22 with the result that torque is transmitted to the other end of the inner shaft 21. In other words, the inner shaft 21 functions as a transmission member that transmits rotation or torque input from one end to the other end.

The outer tube 22 may be in the form of a round tube, a square tube, or a coiled tube that has an inner bore 30 as long as it is flexible and can be bent and deformed. In this embodiment, the outer tube 22 is tubular and has a circular cross section. Since the inner shaft 21 and the outer tube 22 are flexible, the flexible shaft 12 is flexible and bendable.

The outer tube 22 is made of fluororesin (polytetrafluoroethylene, PTFE). The outer tube 22 does not have to be entirely made of fluororesin, and at least a part of the wall defining the inner bore 30 may be made of fluororesin.

As shown in FIG. 4C, grease 35 may be filled between the outer peripheral surface of the inner shaft 21 and the inner peripheral surface of the outer tube 22 defining the inner bore 30. However, the present invention is not limited to this embodiment, but grease 35 may be applied only to either the outer peripheral surface of the inner shaft 21 or the inner peripheral surface of the outer tube 22 defining the inner bore 30. The grease 35 may have a higher viscosity than general-purpose lubricating oil.

The grease 35 may contain fluororesin. In this embodiment, the grease 35 contains fluororesin made of the same material as the wall that defines the inner bore 30 of the outer tube 22.

It is preferable that recesses 37 for storing the grease 35 are provided on either the outer surface of the inner shaft 21 or the wall (inner circumferential surface) of the outer tube 22 that defines the inner bore 30. In this embodiment, since the outer surface of the inner shaft 21 is defined by the wires 27 that are arranged parallel to each other and each have a circular cross section, as shown in FIG. 4C, the recesses 37 are formed between the wires 27 of the winding layer 28 that define the outer circumferential surface. The grease 35 is stored in the recesses 37. However, the recesses 37 are not limited to this form, but for example, recesses 37 (grooves) extending in the circumferential direction may be formed on the inner circumferential surface that defines the inner bore 30 of the outer tube 22.

Figure 5:
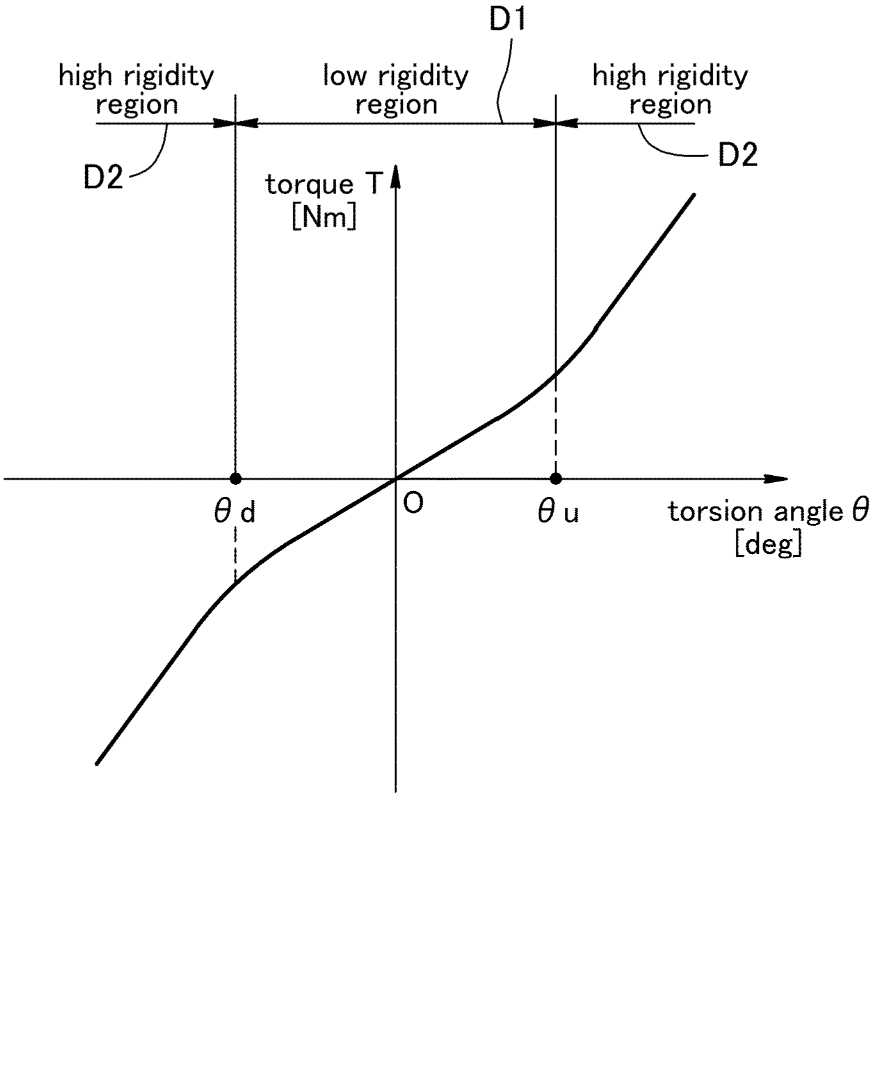
FIG. 5 is a graph showing the torsional rigidity characteristics of a flexible shaft according to the present invention.

FIG. 5 shows the torsional rigidity characteristic (characteristic diagram) representing the relationship between the torsion angle θ of the inner shaft 21 of the flexible shaft 12 according to this embodiment and the torque T acting on one end of the inner shaft 21. As shown in FIG. 5, in this torsional rigidity characteristic, the relationship between the torsion angle θ and the torque Tis symmetrical about the origin.

The smaller the slope dT/dθ of the graph in FIG. 5 is, the easier it is for the inner shaft 21 to twist in response to the input torque T (i.e., softer). Conversely, the greater the slope is, the harder it is for the inner shaft 21 to twist in response to the input torque T (i.e., harder).

As shown in FIG. 5, the flexible shaft 12 according to this embodiment demonstrates a nonlinear characteristic in which it is soft when the torsion angle θ is small and becomes harder as the torsion angle θ increases beyond a certain value. Hereinafter, the region where the slope dT/dθ of the graph is equal to or less than a predetermined threshold value Th (including the point where the torsion angle θ is zero) will be referred to as a first rigidity region D1, and the region where the slope dT/dθ of the graph is greater than the predetermined threshold value Th will be referred to as a second rigidity region D2. As shown in FIG. 5, the second rigidity region D2 corresponds to a region outside the first rigidity region D1 where the absolute value of the torsion angle θ is greater than that of the first rigidity region D1.

Because the slope dT/dθ of the graph of the second rigidity region D2 is greater than the slope dT/dθ of the graph of the first rigidity region D1, the second rigidity region D2 may also be referred to as a high rigidity region, and the first rigidity region D1 may also be referred to as a low rigidity region.

The torsional rigidity characteristics of the inner shaft 21 are discussed, for example, in Asano et al., "Measurements The Twisting Properties of Flexible Shaft Under Two-Way Revolution" (Japan Society of Mechanical Engineers, Annual Meeting 2011, S111053) and Aida et al., "On the Torsional Properties of a Flexible Shaft" ("Materials", Vol. 15, No. 153, pp. 410-417, 1996). According to Asano et al., in the first rigidity region D1, the wires 27 are not sufficiently in contact with each other, and the wires 27 are generally free to deform with the result that the slope dT/dθ of the graph is comparatively small. On the other hand, in the second rigidity region D2, the wires 27 are constricted and come into contact with the wires 27 that make up the inner layer so that a contact load is generated due to the contact with the inner layer of the wires 27. Therefore, it can be deduced that in the second rigidity region D2, the torsional rigidity is increased due to the contact load, and the slope dT/dθ of the graph becomes large.

The torsional stiffness characteristics of the flexible shaft 12 having a plurality of layers of wires 27 wound in alternating directions depend on various parameters such as the spacing of the wires 27 in each layer, the number of wires 27 constituting each layer, and the thickness of the wires 27. By adjusting at least one of these parameters, the flexible shaft 12 can be provided with the property in which the relationship between torque T and torsion angle θ is approximately symmetrical about the origin.

A flexible shaft 12 demonstrating the relationship between torque T and torsion angle θ that is approximately symmetrical about the origin can be produced, for example, by selecting at least the number of wires 27 forming each layer and the thickness of each wire 27 or both of these parameters, preparing multiple flexible shafts 12 with different values of the selected parameters, and selecting the one that demonstrates a symmetry in the relationship between torque T and torsion angle θ.

The symmetry in the relationship between torque T and torsion angle θ on the graph means that the relationship between torsional angle θ and torque T(θ) satisfies the following formula (1) over a range of the torsion angle θ where no plastic deformation occurs to the inner shafts 21.

$$|T(\theta)+T(-\theta)|/T(\theta)=\delta \tag{1}$$

In Equation (1), δ may be zero (0). However, T (θ)=0 should be excluded.

As shown in FIG. 1, one end of the flexible shaft 12, more precisely, one end (input end) of the inner shaft 21, is connected to the output shaft 6B of the first drive device 6. The other end (output end) of the inner shaft 21 is connected to the screw shaft 15 of the single-axis conversion mechanism 11 via the coupling 19. When the output shaft 6B of the first drive device 6 rotates, the inner shaft 21 rotates and the screw shaft 15 of the single-axis conversion mechanism 11 rotates. This causes the nut 16 to move linearly along the axis of the screw shaft 15. In other words, when the torque output from the first drive device 6 is inputted to the input end of the flexible shaft 12, the torque is transmitted to the output end of the flexible shaft 12, and thence to the single-axis conversion mechanism 11 via the coupling 19. The rotation applied to the single-axis conversion mechanism 11 is converted to a linear motion by the single-axis conversion mechanism 11.

The displacement mechanism 13 includes a conversion link 40 provided between the driven member 4 and the single-axis conversion mechanism 11. One end of the conversion link 40 is pivotally connected to the driven member 4 at a rotational axis Z1, and the other end of the conversion link 40 is pivotally connected to the nut 16 at a rotational axis Z2. The rotational axis Z1 between the driven member 4 and the conversion link 40 is provided at a position different from the rotational axis Y between the driven member 4 and the link member 3. As shown in FIG. 1, in this embodiment, the extending direction of the rotational axis Z2 between the conversion link 40 and the nut 16 is set to be perpendicular to the extending direction of the screw shaft 15.

As shown in FIGS. 1 and 2, when the rotation of the output shaft 6B of the first drive device 6 causes the nut 16 to move linearly, the driven member 4 rotates around the rotational axis Z2 relative to the link member 3 in accordance with the movement of the nut 16. Note that in the example shown in FIGS. 1 and. 2, the driven member 4 is composed of a single member, but the present invention is not limited to this embodiment. The driven member 4 may be composed of, for example, a plurality of members connected to each other so as to be rotatable or slidable.

The first drive device 6 can output torque in both directions, and the output shaft 6B can also rotate in both directions. In addition, the inner shaft 21 can rotate in both directions relative to the outer tube 22. Therefore, when the direction of the torque output from the first drive device 6 is reversed, the direction of the movement of the nut 16 is reversed, and the direction of rotation of the driven member 4 is also reversed. In the example shown in FIG. 2, when the nut 16 moves rightward in the drawing, the driven member 4 rotates clockwise in the drawing. When the direction of the torque output from the first drive device 6 is reversed and the nut 16 moves leftward in the drawing, the driven member 4 rotates counter-clockwise in the drawing.

The construction and support structure of the coupling 19 will be described in the following. The coupling 19 is connected to the input end of the screw shaft 15 of the single-axis conversion mechanism 11. The coupling 19 engages the screw shaft 15 so as to be movable in the axial direction of the screw shaft 15 but not rotatable with the screw shaft 15. More specifically, a spline 15A or a serration is formed on the outer circumferential surface of the one end of the screw shaft 15, and the coupling 19 is provided with a cylindrical portion 41 that receives and engages the spline 15A in a rotationally fast manner and a shaft portion 42 that is coaxially and fixedly connected to the cylindrical portion 41. Thus, the cylindrical portion 41 of the coupling 19 receives one end of the screw shaft 15 therein in an axially slidable and rotationally fast manner. The inner shaft 21 of the flexible shaft 12 is connected to the shaft portion 42 of the coupling 19 in a rotationally fast and axially unmovable manner.

The shaft portion 42 of the coupling 19 is supported on the link member 3 by a second bearing 44. The second bearing 44 may be, for example, a ball bearing containing steel balls or a roller bearing containing steel rollers. When the second bearing 44 consists of a roller bearing, the shape of the rollers may be cylindrical, needle-like, conical, barrel-like, etc. The inner race of the second bearing 44 is fitted to the outer surface of the shaft portion 42 of the coupling 19. The outer race of the second bearing 44 is supported by the link member 3. The second bearing 44 supports the radial load and the axial load (thrust load) of the coupling 19.

The coupling 19 supported by the second bearing 44 in this manner cooperates with the second bearing 44 to allow the transmission of torque from the inner shaft 21 of the flexible shaft 12 to the screw shaft 15 while blocking or cutting off the transmission of axial force. A comparison with a comparative example will be made in the following.

Figure 6:
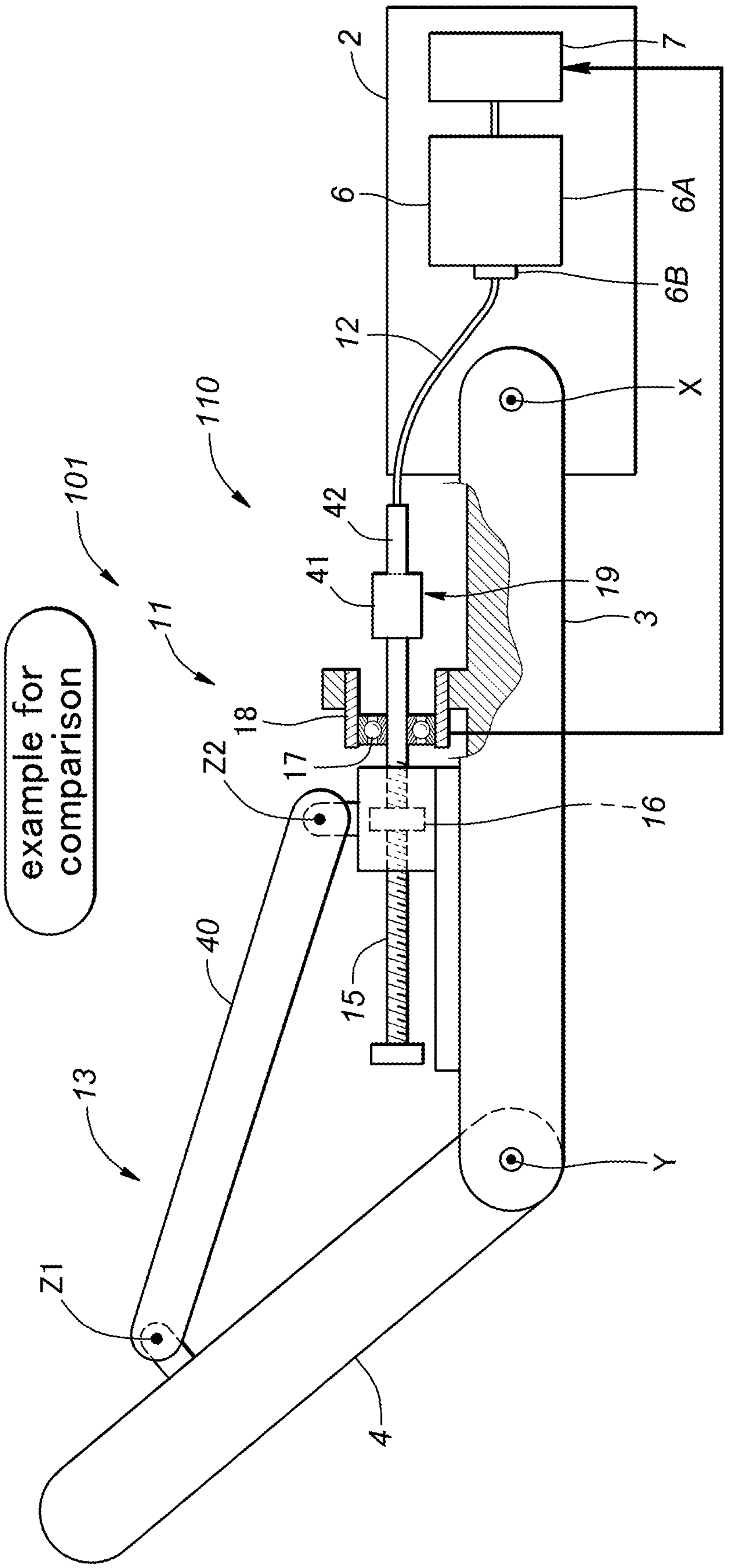
FIG. 6 is a diagram showing an example of the configuration of a robot for comparison.

FIG. 6 shows the configuration of a robot 101 including a transmission mechanism 110 according to a comparative example. The same reference numerals are used for the components of the comparative example as those of the corresponding components of the present embodiment, and description of such common components may be omitted in the following discussion. The transmission mechanism 110 according to the comparative example differs from the present embodiment in the configuration and support structure of the coupling 19. More specifically, the input end of the screw shaft 15 of the single-axis conversion mechanism 11 is tightly fitted into the cylindrical portion 41 of the coupling 19 so that the screw shaft 15 is firmly connected to the cylindrical portion 41 of the coupling 19 in a rotationally fast and axially unmovable manner. The inner shaft 21 of the flexible shaft 12 is connected to the shaft portion 42 of the coupling 19 in a rotationally fast and axially unmovable manner, similarly as in the present embodiment. In addition, this transmission mechanism 110 does not include the second bearing 44 (FIG. 1).

Therefore, the coupling 19 transmits not only the torque of the flexible shaft 12 to the screw shaft 15 but also the axial force input from the flexible shaft 12 to the screw shaft 15. In other words, instead of the axial force of the nut 16 alone acting on the load cell 18, the combined force of the axial force of the nut 16 and the axial force of the flexible shaft 12 acts on the load cell 18. Therefore, the accuracy of the axial force of the nut 16 detected by the load cell 18 is low.

In contrast, in the transmission mechanism 10 of the present embodiment shown in FIG. 1, the coupling 19 transmits the torque of the flexible shaft 12 to the screw shaft 15, but does not transmit the axial force input from the flexible shaft 12 to the screw shaft 15. In other words, only the axial force of the nut 16 acts on the load cell 18, and the axial force of the flexible shaft 12 is blocked by the coupling 19 and does not act on the load cell 18. Therefore, the accuracy of the axial force of the nut 16 detected by the load cell 18 is high.

Next, the effects of the flexible shaft 12 configured in this way and the robot 1 equipped with the flexible shaft 12 will be discussed in the following.

The transmission mechanism 10 of this embodiment has a blocking device (coupling 19) that allows the transmission of torque from the flexible shaft 12 to the screw shaft 15 as described above, while cutting off or blocking the transmission of axial force. Therefore, the axial force generated in the screw shaft 15 is solely due to the axial force of the nut 16, so that the axial force of the nut 16 can be accurately measured by detecting the axial force of the screw shaft 15.

In this embodiment, the conversion mechanism that converts torque into axial force is composed of a screw shaft 15 that constitutes the input shaft, and a ball screw that includes the nut 16 threaded with the screw shaft 15 via balls and forming the output member. Therefore, when an external force in the axial direction is inputted to the nut 16, the nut 16 can move in the axial direction by rotating the screw shaft 15. Therefore, when an external force is inputted to the driven member 4, the driven member 4 does not support an excessively large force so that the force control of the driven member 4 using the first drive device 6 can be favorably performed.

The screw shaft 15 is supported by the load cell 18 so as to be rotatable but immovable in the axial direction by the first bearing 17. The blocking device is provided on a part of the screw shaft 15 located between the flexible shaft 12 and the first bearing 17. Therefore, the axial force of the screw shaft 15 is transmitted to the first bearing 17, but the axial force of the flexible shaft 12 is not transmitted to the first bearing 17. Therefore, the axial force of the nut 16 can be accurately detected from the axial force of the first bearing 17.

As described above, the blocking device includes the coupling 19 for connecting the screw shaft 15 and the flexible shaft 12 to each other, and the second bearing 44 for supporting the coupling 19 rotatably but immovably in the axial direction. Therefore, torque is transmitted from the flexible shaft 12 to the screw shaft 15 via the coupling 19, but the axial force input from the flexible shaft 12 to the coupling 19 is supported by the second bearing 44, so that the transmission of the axial force from the flexible shaft 12 to the screw shaft 15 is blocked.

The coupling 19 is engaged with the screw shaft 15 by the spline 15A in an axially movable and rotationally fast manner. Therefore, the engagement of the coupling 19 with the screw shaft 15 allows the transmission of torque from the flexible shaft 12 to the screw shaft 15. On the other hand, owing to the free axial movement of the coupling 19 relative to the screw shaft 15, the transmission of the axial force from the flexible shaft 12 to the screw shaft 15 is blocked.

The transmission mechanism 10 of this embodiment is provided with a load cell 18 positioned between the link member 3 and the first bearing 17 in order to measure the axial load of the ball screw. Therefore, the axial load of the ball screw can be measured by the load cell 18 so that a highly accurate force control can be realized.

The link member 3 of the robot 1 of this embodiment can be displaced with respect to the base member 2 and the driven member 4. The displacement mechanism 13 is supported by the link member 3 and displaces the driven member 4 with respect to the link member 3 by the torque input received from the transmission mechanism 10. Therefore, the robot 1 can accurately measure the axial load of the nut 16 by detecting the axial force of the screw shaft 15.

The present invention has been described in terms of a specific embodiment, but is not limited by this embodiment and can be modified in various ways without departing from the scope of the present invention. Furthermore, the specific configuration, arrangement, and quantity of each member and part can be appropriately changed as long as it does not deviate from the scope of the present invention. Furthermore, some or all of the configurations of the above embodiment may be combined with each other. On the other hand, all of the components shown in the above embodiment are not necessarily essential for the present invention, and may be substituted and omitted as appropriate.

The invention claimed is:

1. A transmission mechanism configured to be interposed between a drive device and a driven member configured to be driven by a torque outputted by the drive device, the transmission mechanism comprising:

a flexible shaft having an input end receiving the torque outputted by the drive device and an output end outputting the torque;

a conversion mechanism having an input shaft supported by a link member via a first bearing in a rotatable but axially immovable manner and configured to receive the torque from the flexible shaft, a converter for converting the torque of the input shaft into an axial force, and an output member outputting the axial force provided by the converter; and a blocking device that allows the transmission of the torque from the flexible shaft to the input shaft but blocks transmission of an axial force from the flexible shaft to the input shaft, wherein the blocking device includes a coupling that is coupled to the flexible shaft in a rotationally fixed and axially immovable manner, and coupled to the input shaft in an axially movable manner, and a second bearing rotatably supporting the coupling, wherein the flexible shaft is coupled to the input shaft via the coupling, wherein a direction of extension of a rotation axis of the coupling is the same as a direction of linear motion of the output member, and wherein the input shaft is formed to be less flexible than the flexible shaft.

2. The transmission mechanism according to claim 1, wherein the conversion mechanism includes a screw shaft that forms a part of the input shaft and a nut threading with the screw shaft and forms a part of the output member.

3. The transmission mechanism according to claim 2, wherein the screw shaft is rotatably supported by the first bearing which is axially immovably supported by the link member, and the blocking device is provided between the screw shaft and the flexible shaft.

4. The transmission mechanism according to claim 3, wherein the coupling connects the screw shaft to the flexible shaft in an axially movable but rotationally fast manner, and the second bearing supports the coupling on the link member in a freely rotatable but axially immovable manner.

5. The transmission mechanism according to claim 4, wherein the coupling includes a spline coupling.

6. The transmission mechanism according to claim 3, further comprising a load sensor provided between the link member and the first bearing to measure an axial load of the screw shaft.

7. The transmission mechanism according to claim 1, wherein the flexible shaft includes a plurality of wire coils wound in a plurality of coaxial layers and in alternating directions.

8. A robot, comprising:

the transmission mechanism according to claim 1;

a base member supporting the drive device and movably supporting the link member; and the driven member connected to the output member in an actuatable manner.

9. The transmission mechanism according to claim 1, wherein the coupling is coupled to the input shaft in a rotationally fixed and axially movable manner.

10. The transmission mechanism according to claim 9, wherein the coupling includes a cylindrical portion having a bottom wall at one end, wherein the cylindrical portion engages with the input shaft, and wherein a gap is formed in an axial direction between the bottom wall and the input shaft.

11. The transmission mechanism according to claim 10, wherein the coupling further includes a shaft portion disposed coaxially with the cylindrical portion, and wherein the bottom wall of the cylindrical portion is provided on a side of the second bearing with respect to the input shaft.

12. The transmission mechanism according to claim 11, wherein a distance between the bottom wall of the cylindrical portion and the second bearing is shorter than a distance between the bottom wall of the cylindrical portion and the first bearing.

13. The transmission mechanism according to claim 11, wherein the flexible shaft is directly coupled to the coupling, wherein the coupling is directly coupled to the input shaft, and wherein the input shaft is directly coupled to the output member.

14. A transmission mechanism configured to be interposed between a drive device and a driven member configured to be driven by a torque outputted by the drive device, the transmission mechanism comprising:

a flexible shaft having an input end receiving the torque outputted by the drive device and an output end outputting the torque;

a conversion mechanism having an input shaft supported by a link member via a first bearing in a rotatable but axially immovable manner and configured to receive the torque from the flexible shaft, a converter for converting the torque of the input shaft into an axial force, and an output member outputting the axial force provided by the converter; and a blocking device that allows the transmission of the torque from the flexible shaft to the input shaft but blocks transmission of an axial force from the flexible shaft to the input shaft, wherein the blocking device includes a coupling that is coupled to the flexible shaft in a rotationally fixed and axially immovable manner, and coupled to the input shaft in a rotationally fixed and axially movable manner, and a second bearing rotatably supporting the coupling, wherein the coupling includes a cylindrical portion having a bottom wall at one end, and a shaft portion rotatably supported by the second bearing and disposed coaxially with the cylindrical portion, wherein the cylindrical portion engages with the input shaft, wherein a gap is formed in an axial direction between the bottom wall and the input shaft, wherein the bottom wall of the cylindrical portion is provided on a side of the second bearing with respect to the input shaft, wherein the flexible shaft is coupled to the shaft portion, wherein a direction of extension of a rotation axis of the coupling is the same as a direction of linear motion of the output member, and wherein the input shaft is formed to be less flexible than the flexible shaft.

15. A transmission mechanism configured to be interposed between a drive device and a driven member configured to be driven by a torque outputted by the drive device, the transmission mechanism comprising:

a flexible shaft having an input end receiving the torque outputted by the drive device and an output end outputting the torque;

a conversion mechanism having an input shaft supported by a link member via a first bearing in a rotatable but axially immovable manner and configured to receive the torque from the flexible shaft, a converter for converting the torque of the input shaft into an axial force, and an output member outputting the axial force provided by the converter; and a blocking device that allows the transmission of the torque from the flexible shaft to the input shaft but blocks transmission of an axial force from the flexible shaft to the input shaft, wherein the blocking device includes a coupling that is coupled to the flexible shaft in a rotationally fixed and axially immovable manner, and coupled to the input shaft in a rotationally fixed and axially movable manner, and a second bearing rotatably supporting the coupling, wherein the coupling includes a cylindrical portion having a bottom wall at one end, and a shaft portion rotatably supported by the second bearing and disposed coaxially with the cylindrical portion, wherein the cylindrical portion engages with the input shaft, wherein a gap is formed in an axial direction between the bottom wall and the input shaft, wherein the bottom wall of the cylindrical portion is provided on a side of the second bearing with respect to the input shaft, wherein the flexible shaft is coupled to the shaft portion, wherein a direction of extension of a rotation axis of the coupling is the same as a direction of linear motion of the output member, wherein the flexible shaft is directly coupled to the coupling, wherein the coupling is directly coupled to the input shaft, and wherein the input shaft is directly coupled to the output member.

* * * * *